United States Patent
Barchers (10) Patent No.: US 9,482,575 B1
(45) Date of Patent: Nov. 1, 2016

(54) SYSTEM AND METHOD FOR LOW SIGNAL KNIFE EDGE WAVEFRONT SENSING IN AN ADAPTIVE OPTICAL SYSTEM

(71) Applicant: Jeffrey D Barchers, Boulder, CO (US)

(72) Inventor: Jeffrey D Barchers, Boulder, CO (US)

(*) Notice: Subject to any disclaimer, the term of this patent is extended or adjusted under 35 U.S.C. 154(b) by 603 days.

(21) Appl. No.: 14/283,463

(22) Filed: May 21, 2014

(51) Int. Cl.
*G01J 1/44* (2006.01)
*G01J 1/24* (2006.01)
*G02B 26/06* (2006.01)

(52) U.S. Cl.
CPC .. *G01J 1/44* (2013.01); *G01J 1/24* (2013.01); *G01J 2001/444* (2013.01); *G02B 26/06* (2013.01)

(58) Field of Classification Search
CPC ................. G01J 1/44; G01J 2001/444; G01J 2009/002; G01J 9/00; G01J 1/20; G01J 1/22; G01J 1/24; G02B 26/06; G02B 26/00; G01S 17/36; G01S 17/32; G01S 17/08; G01S 17/06; G01S 17/02; G01S 17/00
USPC ...................................................... 250/201.9
See application file for complete search history.

(56) References Cited

U.S. PATENT DOCUMENTS

| | | | |
|---|---|---|---|
| 4,028,702 A | 6/1977 | Levine | |
| 4,635,299 A | 1/1987 | MacGovern | |
| 4,814,774 A | 3/1989 | Herczfeld | |
| 6,452,146 B1 | 9/2002 | Barchers | |
| 6,683,291 B2* | 1/2004 | Barchers | G02B 26/06 250/201.9 |
| 7,343,098 B2 | 3/2008 | Gerwe et al. | |
| 7,402,785 B2 | 7/2008 | Barchers | |
| 8,076,624 B1 | 12/2011 | Barchers | |
| 8,686,331 B2* | 4/2014 | Armstrong | G01J 1/4257 250/201.9 |
| 9,304,313 B1* | 4/2016 | Barchers | G02B 26/06 |
| 2004/0124335 A1* | 7/2004 | Cicchiello | G01J 9/00 250/201.9 |
| 2005/0006559 A1* | 1/2005 | Smith | G01J 1/4257 250/201.9 |
| 2012/0018614 A1* | 1/2012 | King | G02B 26/06 250/201.9 |
| 2012/0032065 A1* | 2/2012 | Armstrong | G01J 1/4257 250/201.9 |
| 2012/0250134 A1* | 10/2012 | Unrath | B23K 26/0613 359/239 |

OTHER PUBLICATIONS

Jeffrey D. Barchers, "Closed-loop stable control of two deformable mirrors for compensation of amplitude and phase fluctuations", J. Opt. Soc. Am. A/vol. 19, No. 5/May 2002.

(Continued)

*Primary Examiner* — John Lee
(74) *Attorney, Agent, or Firm* — Patent Law Offices of Rick Martin, P.C.

(57) ABSTRACT

A System and Method for Low Signal Knife Edge Wavefront Sensing in an Adaptive Optical System to provide measurement and compensation of aberrations induced by propagation through an optical system and through a turbulent medium to a target. The wavefront sensing method requires a minimum signal level for effective operation by taking advantage of the implicit gain afforded by the knife edge principle and incorporating a means for on-line calibration of the knife edge gain. This particular advantage reduces requirements on the laser utilized to generate a beacon signal for wavefront sensing and reduces requirements on the detectors utilized for wavefront sensing, ultimately reducing cost of the method relative to alternative adaptive optical systems using conventional wavefront sensing methods. The method is suitable for use with a broad range of laser sources, including continuous wave and pulsed laser sources, cooperative and non-cooperative targets.

44 Claims, 5 Drawing Sheets

(56) References Cited

OTHER PUBLICATIONS

Jeffrey D. Barchers and Troy A. Rhoadarmer, "Evaluation of phase-shifting approaches for a point-diffraction interferometer with the mutual coherence function", Applied Optics, vol. 41, No. 36, Dec. 20, 2002.

JD Barchers and BL Ellerbroek, "Improved Compensation of turbulence-induced amplitude and phase distorsions by means of multiple near-field phase adjustments", J. Opt. Soc. Am. A, vol. 18, No. 2/Feb. 2001.

Jeffrey D. Barchers, "Evaluation of the impact of finite-resolution effects on scintillation compensation using two deformable mirrors", J. Opt. Soc. Am. A/vol. 18, No. 12, Dec. 2001.

Troy A. Rhoadarmer and Jeffrey D. Barchers, "Noise analysis for complex field estimation using a self-referencing interferometer wave front sensor" Proc. SPIE 4825, High-Resolution Wavefront Control: Methods, Devices, and Applications IV, 215 (Nov. 1, 2002); doi:10.1117/12.450472;http://proceedings.spiedigitallibrary.org/proceeding.aspx?articleid=1314454, presented Jul. 7, 2002.

Kenneth W. Billman, Bruce A. Horwitz, Paul L. Shattuck, "Airborne Laser System Common Path/Common Mode Design Approach", Part of the SPIE Conference on Airborne Laser Advanced Technology II, Orlando, FL, Apr. 1999, SPIE vol. 3706.

Jeffrey D. Barchers, David L. Fried, and Donald J. Link, "Evaluation of the performance of Hartmann sensors in strong scintillation", Applied Optics, vol. 41, No. 6, Feb. 20, 2002.

Jeffrey D. Barchers and David L. Fried, "Optimal control of laser beams for propogation through a turbulent medium", Optical Society of America. A, vol. 19, No. 9, Sep. 2002.

Chris Shelton, Mitchell Troy, Antonin Bouchez, Jennifer Roberts, Thang Trinh, Tuan Truong, "NGS and LGS Adaptive Optics Improving faint light performance", Sep. 14, 2006; NASA/JPL Presentation http://ao.jpl.nasa.gov/Palao/Presentations/Shelton_PSM06.pdf.

Roberto Ragazzoni, "Pupil plane wavefront sensing with an osciallating prism", Journal of Modern Optics, 1996, vol. 43, No. 2, 289-293.

Brignon, Ed. "Coherent Laser Beam Combining", Wiley-VCH, Weinheim Germany, 2013.

* cited by examiner

SYSTEM AND METHOD FOR LOW SIGNAL KNIFE EDGE WAVEFRONT SENSING IN AN ADAPTIVE OPTICAL SYSTEM

CROSS-REFERENCE TO RELATED APPLICATIONS

No related applications

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to a method and several system implementations for a wavefront sensor for an adaptive optical system for compensation of aberrations induced by propagation through a turbulent medium with a cooperative or non-cooperative target. The method is adaptable for use in both imaging and laser projection applications. The method is adaptable for use with a broad range of laser sources. The particular advantage of the present invention is that the wavefront sensor, the gain-calibrated knife edge wavefront sensor, when incorporated with an adaptive optical system, requires a minimum signal level for effective operation by taking advantage of the implicit gain afforded by the knife edge principle and incorporating a means for on-line calibration of the knife edge gain. This particular advantage reduces requirements on the laser utilized to generate a beacon signal for wavefront sensing and reduces requirements on the detector means utilized for wavefront sensing, ultimately reducing cost of the method relative to alternative adaptive optical systems using conventional wavefront sensing methods. A cooperative target refers to a target in which a laser beacon is provided directly by the target for wavefront sensing, whereas a non-cooperative target refers to a target in which no laser beacon is provided directly by the target for wavefront sensing.

BACKGROUND OF THE INVENTION

Adaptive optical system technology has found a wide range of applications including astronomical imaging and long-range free space optical communication. Adaptive optical system technology can potentially enhance any application in which turbulence occurs along the path, leading to refractive index fluctuations due to temperature variations. This turbulence degrades the performance of an imaging or laser projection system. Prior art methods (Ref. 1-13), as referenced in the references cited section below, have been developed to provide methods for compensation of the effects of turbulence on laser propagation through the atmosphere. One of the critical limitations of adaptive optical system technology is the signal level required to make measurements with sufficient accurate to effect high quality compensation for the projected laser beam. While some methods in particular (Ref. 9 and Ref. 10) minimize the required signal for wavefront sensing by use of heterodyne methods, the use of heterodyne methods introduces complexity in adaptive optical system that is not desirable for some applications.

What is needed is a method for wavefront sensing that requires minimum signal level and also minimizes hardware complexity. The present invention meets these needs by developing a variation of a relatively old technology, the classical Foucault knife edge test and the pyramid sensor (Ref. 14), and incorporating a means to compensate for inherent variations in the system gain associated with the transition across the knife edge. As with the pyramid sensor, when operated with a null-seeking adaptive optical system, the knife edge wavefront sensor converges to a state that minimizes signal requirements for the wavefront sensor as the compensation system reaches steady state and a partial level of compensation. The variations in the knife edge wavefront sensor gain with partial compensation of the received wavefront are compensated to take full advantage of the knife edge wavefront sensor gain. A known limitation of the knife edge principle is that the knife edge gain is reduced as aberrations increase. Thus, before the adaptive optical system is operating, the knife edge wavefront sensor gain is reduced, leading to a reduced effective bandwidth that must be compensated to enable the adaptive optical system to initially converge. However, as the adaptive optical system converges and improves the level of compensation, the knife edge wavefront sensor gain increases. If the increased knife edge wavefront sensor gain is not compensated in the system real time controller as the system converges, then the adaptive optical system will become unstable and will be incapable of providing compensation. Thus, gain calibration is required for effective operation of the knife edge wavefront sensor when incorporated in an adaptive optical system. The present invention meets this requirement by incorporating a means for real time gain calibration of the knife edge wavefront sensor.

REFERENCES CITED

1. *Evaluation of phase-shifting approaches for a point-diffraction interferometer with the mutual coherence function.* Barchers, J. D. and Rhoadarmer, T. A. December 2002, Applied Optics, Vol. 41, pp. 7499-7509.
2. *Improved compensation of amplitude and phase fluctuations by means of multiple near field phase adjustments.* Barchers, J. D. and Ellerbroek, B. L. February 2001, Journal of the Optical Society of America A, Vol. 18, pp. 399-411.
3. *Closed loop stable control of two deformable mirrors for compensation of amplitude and phase fluctuations.* Barchers, J. D. 2002, Journal of the Optical Society of America A, Vol. 19, pp. 926-945.
4. *Evaluation of the impact of finite resolution effects on scintillation compensation using two deformable mirrors.* Barchers, J. D. 2001, Journal of the Optical Society of America A, Vol. 18, pp. 3098-3109.
5. *Optimal control of laser beams for propagation through a turbulent medium.* Barchers, J. D. and Fried, D. L. September 2002, Journal of the Optical Society of America A., Vol. 19, pp. 1779-1793.
6. Barchers, J. D. Optimal beam propagation system having adaptive optical systems. U.S. Pat. No. 6,638,291 U.S.A, Jan. 27, 2004.
7. —. Electro-optical field conjugation system. U.S. Pat. No. 6,452,146 U.S.A., Sep. 17, 2002.

8. —. Non-cooperative laser target enhancement system and method. U.S. Pat. No. 8,076,624 Issued Dec. 13, 2011, from U.S. patent application Ser. No. 12/234,041 U.S.A, Sep. 19, 2008.
9. —. Target Feature Integrated Laser Field Conjugation System. Application Ser. No. 12/962,163 U.S.A, filed Dec. 7, 2010.
10. —. Modulated Interferometric Target Feature Wavefront Sensor Ser. No. 13/732,793 U.S.A, 2 Jan. 2013.
11. *Noise analysis for complex field estimation using a self-referencing interferometer wavefront sensor*. Rhoadarmer, T. A. and Barchers, J. D. 2002, Proc. SPIE, Vol. 4825, pp. 215-227.
12. Barchers, J. D. System and method for correction of turbulence effects on laser or other transmission. U.S. Pat. No. 7,402,785 U.S.A, Jul. 22, 2008.
13. Belenkii, M. S. Beaconless adaptive optics system. U.S. patent application Ser. No. 12/157,014 U.S.A, Jun. 6, 2008.
14. *Pupil plane wavefront sensing with an oscillating prism*. Ragazzoni, R. J. Mod. Opt. Vol. 43, 289-293 (1996).
15. *NGS and LGS Adaptive Optics Improving faint light performance*, C. Shelton, Mitchell Troy, Antonin Bouchez, Jennifer Roberts, Thang Trinh, Tuan Truong. NASA/JPL Presentation, 14 Sep. 2006, http://ao.jpl.nasa-.gov/Palao/Presentations/Shelton_PSM06.pdf.

SUMMARY OF THE INVENTION

The primary aspect of the present invention is to provide a method for wavefront sensing in an adaptive optical system, the gain-calibrated knife edge wavefront sensor, that requires a minimum signal level for effective operation by taking advantage of the implicit gain afforded by the knife edge principle and incorporating a means for on-line calibration of the knife edge gain. This particular advantage reduces requirements on the laser utilized to generate a beacon signal for wavefront sensing and reduces requirements on the detector means utilized for wavefront sensing, ultimately reducing cost of the method relative to alternative adaptive optical systems using conventional wavefront sensing methods. The method is suitable for use with a broad range of laser sources, including continuous wave and pulsed laser sources, cooperative and non-cooperative targets.

The invention is summarized as follows: The present invention is an electro-optical system for measurement and compensation of aberrations induced by optical wave propagation through an optical system (110) and through a turbulent path (112) from a target (113) to a telescope (111). The electro-optical system is comprised of a beacon beam receiver that receives an aberrated beacon beam (120) and then passes the aberrated beacon beam (120) through a phase correction device means (104) (which is normally a reflective optical device) to produce a compensated beacon beam (121). The compensated beacon beam (121) then passes through an optical system means (123) that functions to relay the image of the compensated beacon beam (121) at the phase correction device means (104) to a gain-calibrated knife edge wavefront sensor means (124a/124b/124c). The beacon beam receiver is nominally comprised of the phase correction device means (104), the optical system means (123), and the gain-calibrated knife edge wavefront sensor means (124a/124b/124c). The gain-calibrated knife edge wavefront sensor means (124a/124b/124c) functions to split the compensated beacon beam (121) into an "X" gradient compensated beacon beam sample (312/412) and a "Y" gradient compensated beacon beam sample (313/413). The gain-calibrated knife edge wavefront sensor means (124a/124b/124c) functions to focus the "X" gradient compensated beacon beam sample (312/412) onto an "X" knife edge means (321) to produce a first and a second "X" gradient compensated beacon beam sub-sample, that is measured using a first (323) and a second "X" gradient detector means (325) to produce a first and a second "X" gradient detector means signal. The gain-calibrated knife edge wavefront sensor means (124a/124b/124c) also functions to focus the "Y" gradient compensated beacon beam sample (313/413) onto a "Y" knife edge means (341) that produces a first and a second "Y" gradient compensated beacon beam sub-sample, measuring the first and a second "Y" gradient compensated beacon beam sub-sample using a first (343) and a second "Y" gradient detector means (345) to produce a first and a second "Y" gradient detector means signal. The gain-calibrated knife edge wavefront sensor means (124a/124b/124c) also functions to produce an "X" knife edge gain calibration signal and a "Y" knife edge gain calibration signal. The electro-optical system includes a real time processor means that functions to process the first and second "X" gradient detector means signals, the first and second "Y" gradient detector means signals, the "X" knife edge gain calibration signal and the "Y" knife edge gain calibration signal, to produce an "X" gradient signal and a "Y" gradient signal that is further processed to form a command signal for the phase correction device to null a wavefront phase error of the compensated beacon beam (121) measured by the gain-calibrated knife edge wavefront sensor means (124a/124b/124c).

Other aspects of this invention will appear from the following description of the drawings and appended claims, reference being made to the accompanying drawings forming a part of this specification wherein like reference characters designate corresponding parts in the several views.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
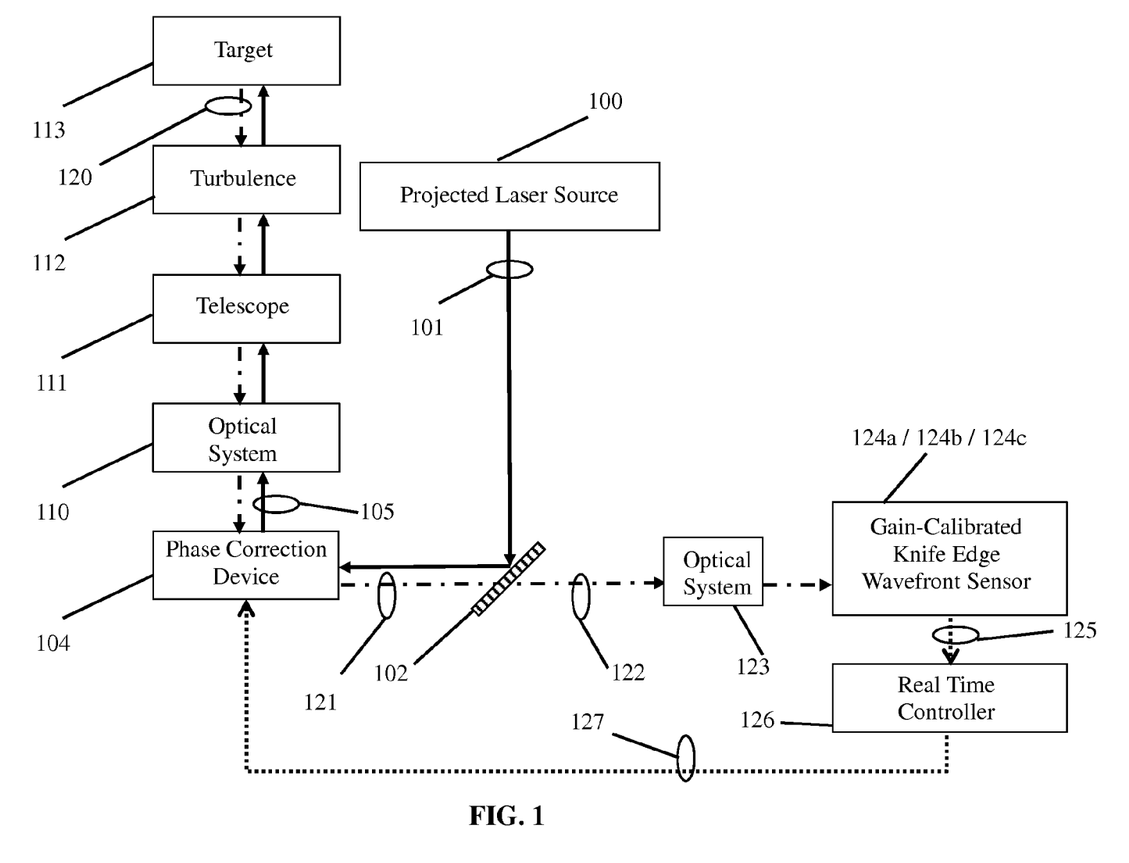
FIG. 1 provides a schematic of a generic adaptive optical system for projection of laser beams through a turbulent medium with a cooperative or non-cooperative target to provide context for the present invention.
Figure 3:
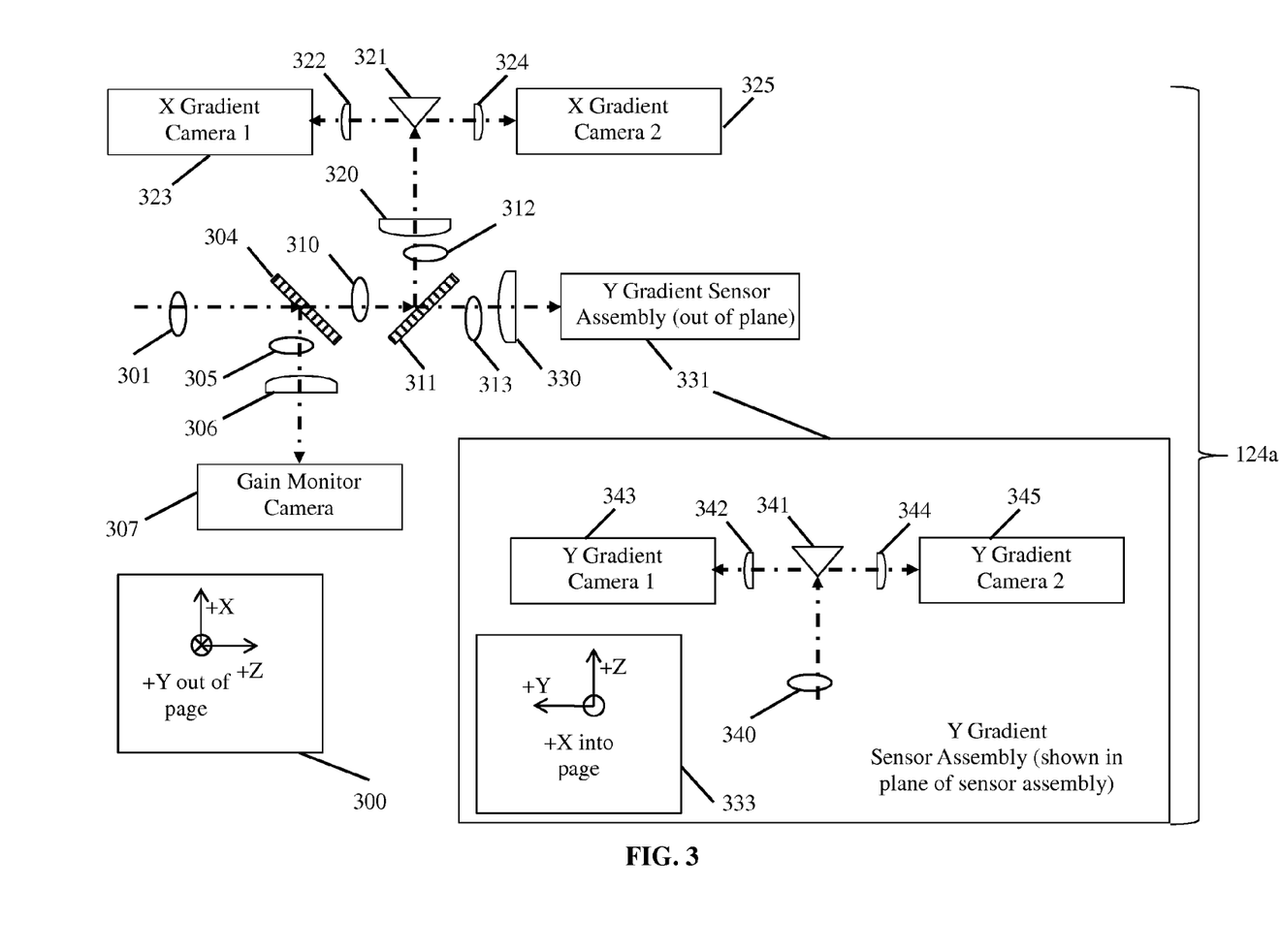
FIG. 3 is a schematic of the first embodiment of the gain-calibrated knife edge wavefront sensor in the present invention. The present invention is comprised of an adaptive optical system utilizing a gain-calibrated knife edge wavefront sensor. Taken in combination, FIG. 3 combined with FIG. 1 or FIG. 2 form the first embodiment of the present invention.
Figure 4:
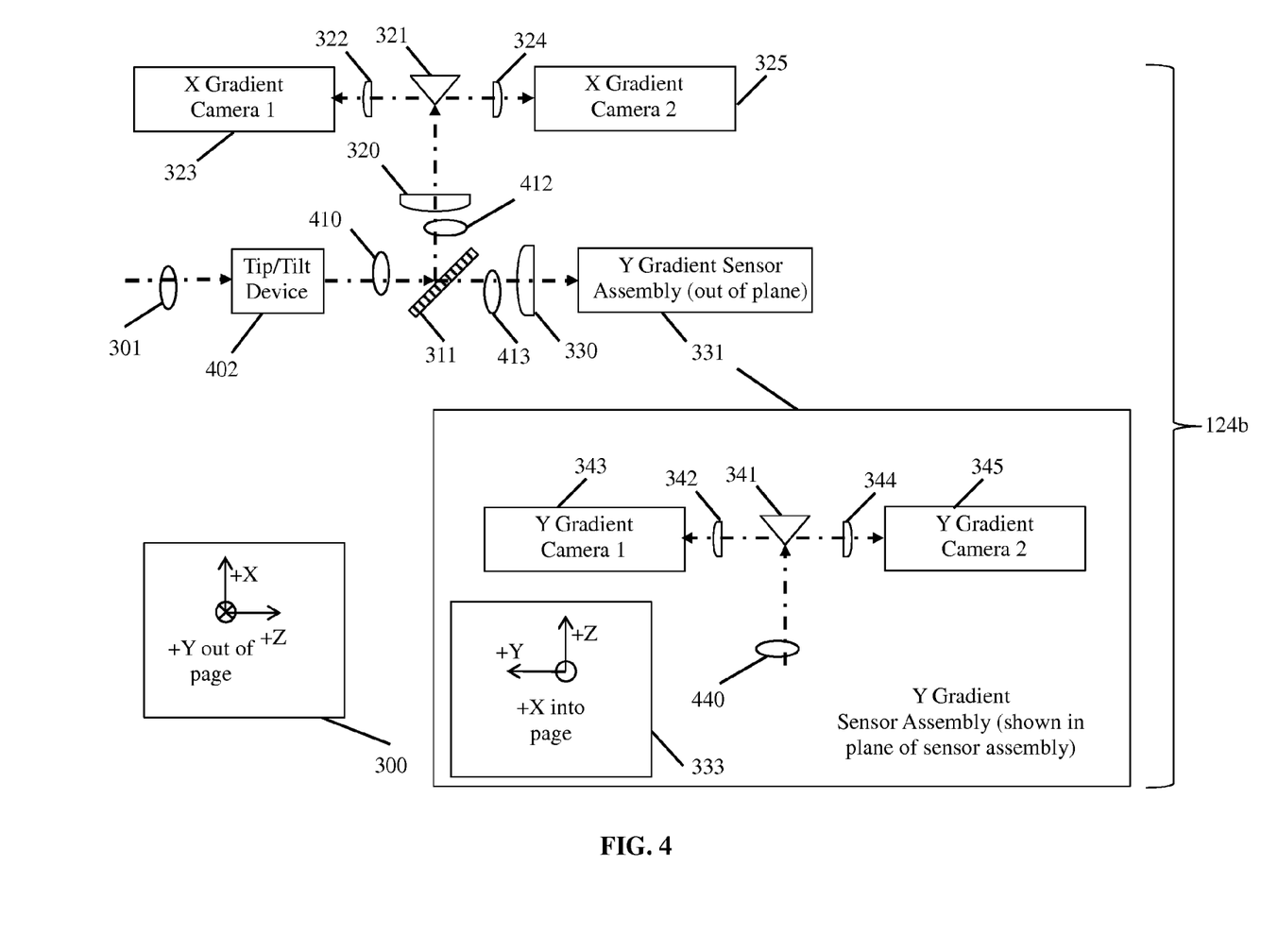
FIG. 4 is a schematic of the second embodiment of the gain-calibrated knife edge wavefront sensor in the present invention. The present invention is comprised of an adaptive optical system utilizing a gain-calibrated knife edge wavefront sensor. Taken in combination, FIG. 4 combined with FIG. 1 or FIG. 2 form the second embodiment of the present invention.

FIG. 1 provides a schematic of a generic adaptive optical system for projection of laser beams through a turbulent medium with a cooperative or non-cooperative target to provide context for the present invention. The present invention is comprised of an adaptive optical system utilizing a gain-calibrated knife edge wavefront sensor. The gain-calibrated knife edge wavefront sensor has little utility in and of itself for measurement of aberrations in a laser beam. However, when used in conjunction with an adaptive optical system in an appropriate null-seeking fashion the gain-calibrated knife edge wavefront sensor offers a significant reduction in the required signal level for operation. The reader should note that the present invention can be utilized for image compensation as well as laser projection—the inclusion of a projected laser source is not material to the present invention but we do include the projected laser source and projected laser beam to illustrate one potential application of interest. All elements of FIG. 1 are prior art but for block 124a/124b/124c, the gain-calibrated knife edge wavefront sensor means 124a/124b/124c, where 124a is a first preferred embodiment of the gain-calibrated knife edge wavefront sensor means described in FIG. 3, 124b is a second preferred embodiment of the gain-calibrated knife edge wavefront sensor means described in FIG. 4, and 124c is a third preferred embodiment of the gain-calibrated knife edge wavefront sensor means described in FIG. 5. The addition of block 124a/124b/124c, the gain-calibrated knife edge wavefront sensor means 124a/124b/124c, is a useful and non-obvious improvement in the art.

FIG. 1 is shown by way of example and not of limitation. There are alternate means of displaying the laser path(s) as those skilled in the art would recognize. Shown in FIG. 1 is the projected laser source 100. The projected laser source 100 produces the projected laser beam 101. The projected laser beam 101 encounters an aperture sharing element 102 which reflects the wavelength of the projected laser beam 101. The projected laser beam 101 transmits to a primary phase correction device means 104 which applies phase correction for compensation of aberrations induced by propagation through a turbulent medium compensated projected laser beam 105. The primary phase correction device means 104 is understood to be implemented by one of numerous means well known to those skilled in the art, including but not limited to a continuous facesheet deformable mirror, a segmented deformable mirror, or a liquid crystal phase correction device. The primary phase correction device means 104 could be a plurality of devices in series if this is required to meet dynamic range and/or sampling requirements.

After compensation by the phase correction device, the compensated projected laser beam 105 transmits through an optical system 110 which relays the compensated projected laser beam 105 to a transmitting telescope 111, also commonly known as a beam director, a turbulent medium 112, and to a target 113. It is understood by those skilled in the art that the optical system 110 should include additional mirrors and optics required for pointing and stabilization of the beam propagation path from the projected laser source 100 to the target 113. There are numerous means to implement pointing and stabilization well known to those skilled in the art.

A beacon laser beam 120 is formed at the target by one of numerous means well known to those skilled in the art. If the target is a cooperative target then the beacon laser beam 120 is formed within the target 113 and projected by an optical system within the target 113 toward the telescope 111. If the target is a non-cooperative target, then the beacon laser beam 120 is formed by one of numerous means well known to those skilled in the art to form a reflected signal from the target 113 that can be used as a beacon laser source. Such methods include, but are not limited to, those methods described in Ref. 8-10. The beacon laser beam 120 propagates back through the turbulent medium 112, the telescope 111, and the optical system 110 which directs the beam to the primary phase correction device means 104 to form the compensated beacon laser beam 121.

The compensated beacon beam 121 transmits through the aperture sharing element 102 to obtain the beacon beam sample 122. The beacon beam sample 122 propagates through a second optical system 123 which relays the beacon beam sample 122 to the gain-corrected knife edge wavefront sensor means 124. The gain-calibrated knife edge wavefront sensor means 124 produces a signal 125 that is processed by the real time controller 126 to produce the phase correction device command signal 127. When operated in a closed loop fashion, the phase correction device command signal 127 causes the phase correction device means 104 to converge to a steady state that nulls the wavefront error of the received beacon laser beam 120 to produce the compensated beacon laser beam 121.

It is understood by those skilled in the art that the optical system illustrated in FIG. 1 will normally also include a tracking system to stabilize the beam path and provide tip/tilt compensation. There are multiple means to provide such stabilization well known to those skilled in the art. The gain-calibrated knife edge wavefront sensor, like most other wavefront sensors, can be used to provide a sensor signal to control a beam steering device to provide tip/tilt compensation.

Figure 2:
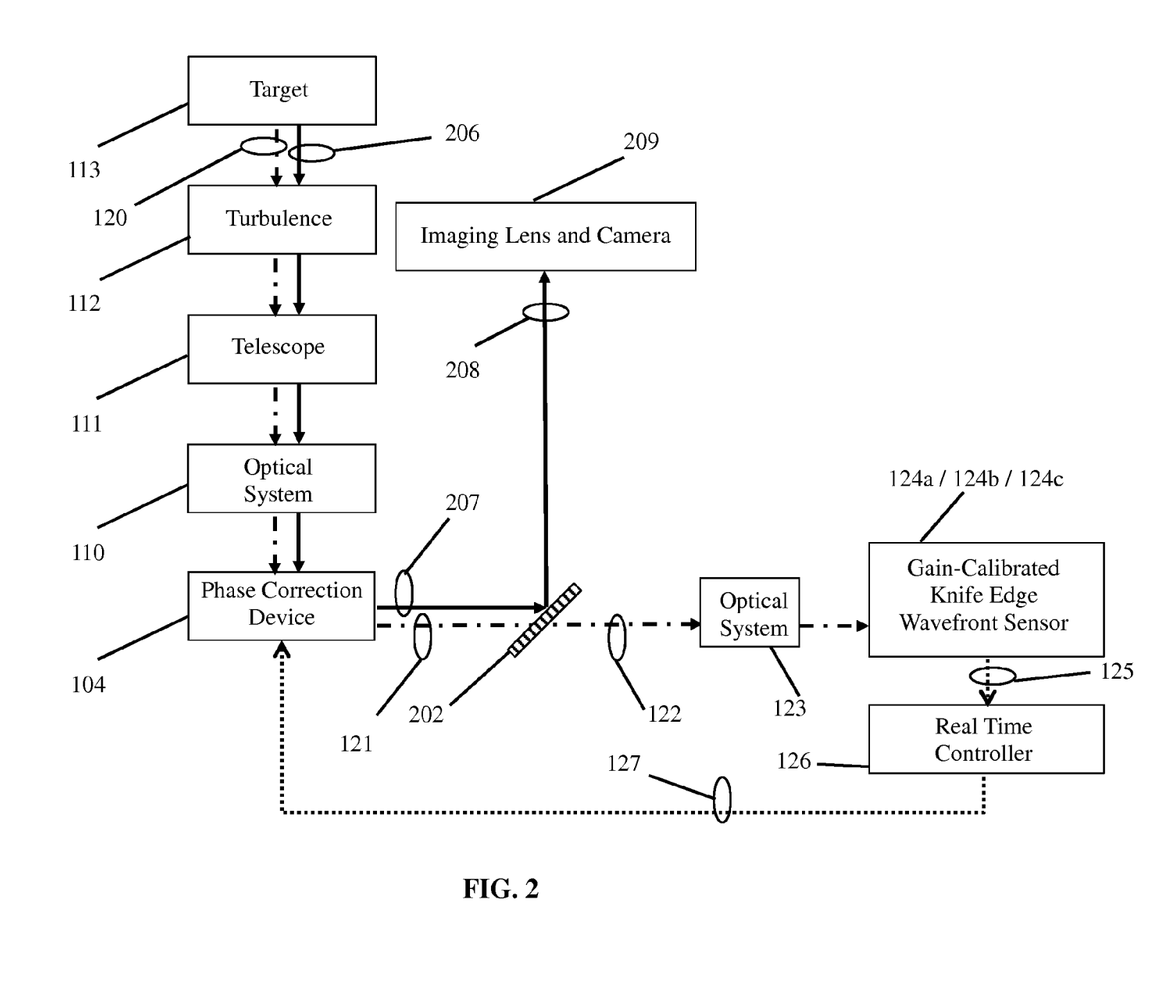
FIG. 2 provides a schematic of a generic adaptive optical system for compensated imaging through a turbulent medium with a cooperative or non-cooperative target to provide context for the present invention.

FIG. 2 provides a schematic of a generic adaptive optical system for compensated imaging through a turbulent medium with a cooperative or non-cooperative target to provide context for the present invention. The present invention is comprised of an adaptive optical system utilizing a gain-calibrated knife edge wavefront sensor. The gain-calibrated knife edge wavefront sensor has little utility in and of itself for measurement of aberrations in a laser beam. However, when used in conjunction with an adaptive optical system in an appropriate null-seeking fashion the gain-calibrated knife edge wavefront sensor offers a significant reduction in the required signal level for operation. As such, the present invention offers a means to image faint objects through a turbulent medium with high effectivness. All elements of FIG. 2 are prior art but for block 124a/124b/124c, the gain-calibrated knife edge wavefront sensor means 124a/124b/124c, where 124a is a first preferred embodiment of the gain-calibrated knife edge wavefront sensor means described in FIG. 3, 124b is a second preferred embodiment of the gain-calibrated knife edge wavefront sensor means described in FIG. 4, and 124c is a third preferred embodiment of the gain-calibrated knife edge wavefront sensor means described in FIG. 5. The addition of block 124a/

124b/124c, the gain-calibrated knife edge wavefront sensor means 124a/124b/124c, is a useful and non-obvious improvement in the art.

FIG. 2 is shown by way of example and not of limitation. There are alternate means of displaying the laser path(s) as those skilled in the art would recognize. Shown in FIG. 2 are the same components as in FIG. 1, however the path from the projected laser source 100 to the target 113 has been replaced with an imaging path from the target 113 to the imaging lens and detector means 209. The imaging path begins with a target image beam 206 that is formed at the target by one of numerous means well known to those skilled in the art. This includes but is not limited to various forms of active illumination but also can include passive illumination. The target image beam 206 propagates through the turbulent medium 112, the telescope 111, and the optical system 110 which directs the beam to the primary phase correction device means 104 to form the compensated target image beam 207. The compensated target image beam 207 encounters the aperture sharing element 202 which directs the compensated target image beam sample 208 to the imaging lens and detector means 209.

The beacon beam path from the target 113 to the gain-corrected knife edge wavefront sensor 124 is identical to that in FIG. 1 and the phase correction device means 104 is controlled in the same manner as in FIG. 1 to null the wavefront error on the compensated beacon beam 121. This results in correspondingly improved compensation for the compensated target image beam 207, leading to improved imagery obtained on the imaging lens and detector means 209.

As with FIG. 1, it is understood by those skilled in the art that the optical system illustrated in FIG. 2 will normally also include a tracking system to stabilize the beam path and provide tip/tilt compensation. There are multiple means to provide such stabilization well known to those skilled in the art. The gain-calibrated knife edge wavefront sensor, like most other wavefront sensors, can be used to provide a sensor signal to control a beam steering device to provide tip/tilt compensation.

FIG. 3 is a schematic of the first embodiment of the gain-calibrated knife edge wavefront sensor in the present invention. The present invention is comprised of an adaptive optical system utilizing a gain-calibrated knife edge wavefront sensor. Taken in combination, FIG. 3 combined with FIG. 1 or FIG. 2 form the first embodiment of the present invention. FIG. 3 is shown by way of example and not of limitation. There are alternate means of displaying the laser path(s) and/or carrying out the data processing as those skilled in the art would recognize.

Shown in FIG. 3, a beacon beam sample 301 enters the gain-calibrated knife edge wavefront sensor. The beacon beam sample 301 encounters a first beam splitter means 304 that produces a minority beacon beam sample 305 and a majority beacon beam sample 310. The minority beacon beam sample 305 is directed to a focusing lens 306 that produces a beam focus at the gain monitor detector means 307. The gain monitor detector means produces a focused image of the beacon beam sample 301 that can be processed to produce an estimate of the Strehl ratio, denoted S, of the beacon beam sample 301 and an estimate of the beam centroid, $x_c$ and $y_c$, of the beacon beam sample 301 by multiple means well known to those skilled in the art. The most straightforward means to produce an estimate of the Strehl ratio, S, is described here. Given a plurality of detector means pixel measurements with appropriate gain and offset calibration, I(n,m), where n and m are the row and column indices of the data. Define a bucket function, B(n, m), that describes a roughly 1 λ/D size bucket for the pixel spacing of the gain monitor detector means 307. The Strehl ratio estimate is then given by, $$S \approx \max[I(n,m) \otimes B(n,m)]/\text{sum}[I(n,m)]/I_{REF}, \quad \text{(Eq 1)}$$

where $\otimes$ denotes convolution and $I_{REF}$ is the value of $\max[I(n,m) \otimes B(n,m)]/\text{sum}[I(n,m)]$ when the image I(n,m) is a diffraction limited beam on the gain monitor detector means 307. There are other means to produce a Strehl ratio estimate and the above description is provided by way of example and not of limitation.

The data from the gain monitor detector means 307 can also be used to produce an estimate of the beam centroid, $x_c$ and $y_c$, on the gain monitor detector means 307 using the thresholded centroid method. The thresholded centroid method is well known to those skilled in the art. Other methods well known to those skilled in the art to estimate the beam centroid can be utilized as well. The Strehl ratio estimate, S, as well as the beam centroid, $x_c$ and $y_c$, can all be indexed in time by the frame index k, i.e. S(k) and $x_c(k)$ and $y_c(k)$.

The gain monitor detector means 307 can also be a position sensitive device instead of an array detector. In this case the gain monitor detector means 307 would only produce an estimate of the beam centroid, $x_c$ and $y_c$, of the beacon beam sample 301. This option limits the methods that can be utilized for gain calibration of the gain-calibrated knife edge wavefront sensor but may be appropriate for some applications.

The majority beacon beam sample 310 encounters a second beam splitter means 311 which produces an X gradient sample 312 and a Y gradient sample 313. The X gradient sample 312 is focused by the X focusing lens 320 onto the X knife edge 321. The X knife edge 321 produces a sample of the X gradient sample 312 that is directed to the first X collimating lens 322 and first X gradient detector means 323 and a sample of the X gradient sample 312 that is directed to the second X collimating lens 324 and second X gradient detector means 325. The combination of the following components forms the "X Gradient Sensor": X knife edge 321, first X collimating lens 322, first X gradient detector means 323, second X collimating lens 324, and second X gradient detector means 325. The first X gradient detector means 323 and the second X gradient detector means 325 are both optically conjugate to the system pupil, which nominally corresponds to the pupil-conjugate plane of the phase correction device means 104.

The Y gradient sample 313 encounters the Y focusing lens 330 which focuses the beam into the "Y Gradient Sensor" 331 which is understood to be identical to the "X Gradient Sensor" oriented in the orthogonal plane as shown in FIG. 3 by consideration of the primary coordinate system 300 and the secondary coordinate system 333. It is understood by those skilled in the art that a dove prism or any other set of optics to rotate the Y gradient sample 313 can be used to avoid the requirement that the "Y Gradient Sensor" 331 be oriented in the orthogonal plane as shown in FIG. 3. Within the "Y Gradient Sensor" 331 the focusing Y gradient sample 340 encounters the Y knife edge 341. The Y knife edge 341 produces a sample of the focusing Y gradient sample 340 that is directed to the first Y collimating lens 342 and first Y gradient detector means 343 and a sample of the focusing Y gradient sample 340 that is directed to the second Y collimating lens 344 and second Y gradient detector means 345. The first Y gradient detector means 343 and the second Y gradient detector means 345 are both optically conjugate to the system pupil, which nominally corresponds to the pupil-conjugate plane of the phase correction device means 104.

There are numerous variations of the optical schematic provided in FIG. 3 for implementation of the "X Gradient Sensor" and the "Y Gradient Sensor". The description in FIG. 3 is provided by way of example and not by way of limitation. For example, the X knife edge 321 and the Y knife edge 341 can be a shallow angle transmissive prism that produces a pair of pupil plane images with a single collimating lens (similar to the method utilized in Ref. 14 for the classical pyramid sensor). This variation would only require 2 detector means (instead of 4 detector means required for the gradient measurement)—which would simplify the optical configuration but would lead to a slower detector means readout. The entire optical configuration can be arranged to place all four images on a single detector means. This would eliminate the need for multiple detector means but would in turn lead to a very complex optical assembly. The description in FIG. 3 is considered to be the preferred embodiment for most applications.

Not shown in FIG. 3, a bi-refringent optic in the correct orientation can be inserted between the X focusing lens 320 and the X knife edge 321 to effect placing the focus slightly before and after the X knife edge 321 at orthogonal polarizations. Similarly, a bi-refringent optic in the correct orientation can be inserted between the Y focusing lens 330 and the Y knife edge 341 to effect placing the focus slightly before and after the Y knife edge 341 at orthogonal polarizations. This has the effect of reducing the knife edge wavefront sensor gain, generally leading to reduced sensor sensitivity (i.e. requiring more light to operate) but possibly having the advantage in some applications of improved performance.

The pupil plane pixel data from the X gradient detector means 1 323 is given by $X_1(n,m)$. The pupil plane pixel data from the X gradient detector means 2 325 is given by $X_2(n,m)$. The pupil plane pixel data from the Y gradient detector means 1 343 is given by $Y_1(n,m)$. The pupil plane pixel data from the Y gradient detector means 2 345 is given by $Y_2(n,m)$. An estimate of the X gradient, $s_X(n,m)$, and the Y gradient, $s_Y(n,m)$, is given by, $$s_X(n,m)=K_X(n,m)[X_1(n,m)-X_2(n,m)]/[X_1(n,m)+X_2(n,m)], \quad (Eq\ 2)$$

$$s_Y(n,m)=K_Y(n,m)[Y_1(n,m)-Y_2(n,m)]/[Y_1(n,m)+Y_2(n,m)], \quad (Eq\ 3)$$

where $K_X(n,m)$ and $K_Y(n,m)$ are the estimated small signal gain maps required to correct for variations in the small signal gain of the knife edge wavefront sensor. It is understood by those skilled in the art that some method of avoiding a divide by zero or a divide by a very small number is required. Both "gradient smashing" and the "clamped denominator" method (Ref. 15) can be utilized. Gradient smashing refers to setting the gradient value to zero when the denominator of Equation 2 or Equation 3 falls below a noise floor threshold. Clamped Denominator refers to setting the denominator of Equation 2 or Equation 3 to a minimum value, thus still producing a non-zero gradient but preventing amplification of noise by dividing by a very small number. The resultant gradients are reconstructed to produce a phase estimate using standard means well known to those skilled in the art. The resultant phase estimate is used in a standard null seeking control loop to produce the phase correction device command signal 127 using standard means well known to those skilled in the art.

The calibration of the gain $K_X(n,m)$ and $K_Y(n,m)$ can be accomplished by multiple means. We provide three nominal means by way of example and not by way of limitation herein for the purpose of completeness. In all three cases, there is a nominal gain that must be calibrated for a beam with no aberrations, this gain is denoted $K_{X0}(n,m)$ and $K_{Y0}(n,m)$. This calibration, well understood by those skilled in the art, is obtained by introducing a known small amplitude tilt in the x and y axes and measuring the resultant observed gradients. The required nominal gain $K_{X0}(n,m)$ and $K_{Y0}(n,m)$ is then obtained by taking the ratio of the known tilt input to the observed gradients. Depending on the strength of aberrations in the incident beam, the knife edge wavefront sensor gain is reduced by approximately the square root of the Strehl ratio. Thus, the gain maps $K_X(n,m)$ and $K_Y(n,m)$ can be given by the following, $$K_X(n,m)=K_{X0}(n,m)/[S_f(k)]^{1/2} \quad (Eq\ 4)$$

$$K_Y(n,m)=K_{Y0}(n,m)/[S_f(k)]^{1/2}, \quad (Eq\ 5)$$

where $S_f(k)$ is a temporally filtered estimate of the Strehl ratio, given by, $$S_f(k)=b_S S_f(k)+a_S S(k), \quad (Eq\ 6)$$

where $b_S$ is typically about 0.7 to 0.99 (depending on the desired filtering) and where $a_S=1-b_S$.

Alternately, the gain maps can be determined by direct on-line calibration using the beam centroid data from the gain monitor detector means 307. Given a time sequence of beam centroid data, $x_c(k)$ and $y_c(k)$, and X and Y gradient data, $s_X(n,m,k)$ and $s_Y(n,m,k)$ (where we have introduced a time index, k, for the X and Y gradient data), an estimate of the small signal gain map can be computed using the inner product, $$V_X(n,m)=\Sigma_{p=k-P}^{k} s_X(n,m,p)x_c(p)/\Sigma_{p=k-P}^{k} x_c(p)x_c(p), \quad (Eq\ 7)$$

$$V_Y(n,m)=\Sigma_{p=k-P}^{k} s_Y(n,m,p)y_c(p)/\Sigma_{p=k-P}^{k} y_c(p)y_c(p), \quad (Eq\ 8)$$

where k is the current time index and P is the number of samples to sum. There are two strategies for processing the data. The first is to directly use the processed data for on-line gain calibration (which can lead to noise sensitivity unless a very large value for P) is utilized, $$K_X(n,m)=1/V_X(n,m), \quad (Eq\ 9)$$

$$K_Y(n,m)=1/V_Y(n,m). \quad (Eq\ 10)$$

The second, more conservative approach is to only allow the average gain (rather than individual subaperture gain) to be modulated, $$K_X(n,m)=K_{X0}(n,m)/\langle V_X(n,m)/K_{X0}(n,m) \rangle_{n,m}, \quad (Eq\ 11)$$

$$K_Y(n,m)=K_{Y0}(n,m)/\langle V_Y(n,m)/K_{Y0}(n,m) \rangle_{n,m}, \quad (Eq\ 12)$$

where $\langle \cdot \rangle_{n,m}$ denotes averaging over the actively illuminated subapertures. As with use of the Strehl estimate to form the gain calibration signal, the direct measurement of the signal can also be temporally filtered to smooth variations in the signal. In addition, as is well known to those skilled in the art, the gain signals can be estimated in a recursive fashion. Depending on the noise characteristics of the data, as is well known to those skilled in the art, it also may be useful to instead estimate the quantities $V_X(n,m)$ and $V_Y(n,m)$ using an alternate formulation, $$V_X(n,m)=\Sigma_{p=k-P}^{k} S_x(n,m,p)s_x(n,m,p)/\Sigma_{p=k-P}^{k} x_c(p)s_x(n,m,p), \quad (Eq\ 7)$$

$$V_Y(n,m)=\Sigma_{p=k-P}^{k} S_y(n,m,p)s_y(n,m,p)/\Sigma_{p=k-P}^{k} y_c(p)s_y(n,m,p). \quad (Eq\ 7)$$

If the noise variance in the X and Y gradient data, $s_X(n,m,k)$ and $s_Y(n,m,k)$, is less than that in the beam centroid data, $x_c(k)$ and $y_c(k)$, then this may indeed turn prove to be preferable.

The third calibration approach first computes the average value of the observed gradient (averaged over the illuminated subapertures) for each value in the time sequence, $$s_X(k) = \langle s_X(n,m,k)/K_{X0}(n,m) \rangle_{n,m}, \quad \text{(Eq 15)}$$

$$s_Y(k) = \langle s_Y(n,m,k)/K_{Y0}(n,m) \rangle_{n,m}, \quad \text{(Eq 16)}$$

Then, the scalar gain can be computed over the most recent P frame of data, $$V_X = \Sigma_{p=k-P}^{k} S_x(p) x_c(p) / \Sigma_{p=k-P}^{k} x_c(p) x_c(p), \quad \text{(Eq 17)}$$

$$V_Y = \Sigma_{p=k-P}^{k} S_y(p) y_c(p) / \Sigma_{p=k-P}^{k} y_c(p) y_c(p), \quad \text{(Eq 18)}$$

and the gain maps $K_X(n,m)$ and $K_Y(n,m)$ are then given by the following, $$K_X(n,m) = K_{X0}(n,m)/V_X, \quad \text{(Eq 19)}$$

$$K_Y(n,m) = K_{Y0}(n,m)/V_Y, \quad \text{(Eq 20)}$$

As noted above, the calculations in equation 17 and equation 18 can be carried out recursively by methods well known to those skilled in the art. Also again, depending on the noise properties of the data, it may be preferable to estimate $V_X$ and $V_Y$ by the following, $$V_X = \Sigma_{p=k-P}^{k} S_x(p) s_x(p) / \Sigma_{p=k-P}^{k} s_x(p) x_c(p), \quad \text{(Eq 21)}$$

$$V_Y = \Sigma_{p=k-P}^{k} S_y(p) s_y(p) / \Sigma_{p=k-P}^{k} s_y(p) y_c(p), \quad \text{(Eq 22)}$$

If the noise variance in the X and Y average gradient data, $s_X(k)$ and $s_Y(k)$, is less than that in the beam centroid data, $x_c(k)$ and $y_c(k)$, then this may indeed turn prove to be preferable.

It is noted that the gain monitor detector means 307 will require less signal than the detector means utilized in the X and Y Gradient Sensor Assemblies. This is because the light projected onto the gain monitor detector means is focused onto only a few pixels in steady state.

FIG. 4 is a schematic of the second embodiment of the gain-calibrated knife edge wavefront sensor in the present invention. The present invention is comprised of an adaptive optical system utilizing a gain-calibrated knife edge wavefront sensor. Taken in combination, FIG. 4 combined with FIG. 1 or FIG. 2 form the second embodiment of the present invention. FIG. 4 is shown by way of example and not of limitation. There are alternate means of displaying the laser path(s) and/or carrying out the data processing as those skilled in the art would recognize.

Shown in FIG. 4, a beacon beam sample 301 enters the gain-calibrated knife edge wavefront sensor. The beacon beam sample 301 encounters a tip/tilt device 402 that provides a known (i.e. calibrated) time sequence very small signal sinusoidal tip/tilt error with frequency $f_x$ and $f_y$ and amplitude $A_x$ and $A_y$ (nominally small enough such that the beam still remains crossing the knife edge when the beam is aberration free) to produce the modulated beacon beam sample 410. The tip/tilt device 402 can be implemented using one of numerous means well known to those skilled in the art and should be near a pupil plane to avoid translation of the beams on the first X gradient detector means 323 and the first X gradient detector means 325 and on the first Y gradient detector means 343 and the second Y gradient detector means 345. Potential means to implement the tip/tilt device include, but are not limited to, a Risley Prism on a rotating stage or a fine steering mirror. The use of the known (i.e. calibrated) tip/tilt input signal for gain calibration will be explained shortly.

The modulated beacon beam sample 410 encounters a second beam splitter means 311 which produces a modulated X gradient sample 412 and a modulated Y gradient sample 413. The modulated X gradient sample 412 is focused by the X focusing lens 320 onto the X knife edge 321. The X knife edge 321 produces a sample of the modulated X gradient sample 412 that is directed to the first X collimating lens 322 and first X gradient detector means 323 and a sample of the modulated X gradient sample 412 that is directed to the second X collimating lens 324 and second X gradient detector means 325. The combination of the following components forms the "X Gradient Sensor": X knife edge 321, first X collimating lens 322, first X gradient detector means 323, second X collimating lens 324, and second X gradient detector means 325. The first X gradient detector means 323 and the second X gradient detector means 325 are both optically conjugate to the system pupil, which nominally corresponds to the pupil-conjugate plane of the phase correction device means 104.

The modulated Y gradient sample 413 encounters the Y focusing lens 330 which focuses the beam into the "Y Gradient Sensor" 331 which is understood to be identical to the "X Gradient Sensor" oriented in the orthogonal plane as shown in FIG. 4 by consideration of the primary coordinate system 300 and the secondary coordinate system 333. It is understood by those skilled in the art that a dove prism or any other set of optics to rotate the modulated Y gradient sample 413 can be used to avoid the requirement that the "Y Gradient Sensor" 331 be oriented in the orthogonal plane as shown in FIG. 4. Within the "Y Gradient Sensor" 331 the focusing modulated Y gradient sample 440 encounters the Y knife edge 341. The Y knife edge 341 produces a sample of the focusing modulated Y gradient sample 440 that is directed to the first Y collimating lens 342 and first Y gradient detector means 343 and a sample of the focusing modulated Y gradient sample 440 that is directed to the second Y collimating lens 344 and second Y gradient detector means 345. The first Y gradient detector means 343 and the second Y gradient detector means 345 are both optically conjugate to the system pupil, which nominally corresponds to the pupil-conjugate plane of the phase correction device means 104.

As with FIG. 3, there are numerous variations of the optical schematic provided in FIG. 4 for implementation of the "X Gradient Sensor" and the "Y Gradient Sensor". The description in FIG. 4 is provided by way of example and not by way of limitation. The same alternate configurations described for FIG. 3 apply to FIG. 4. The description in FIG. 4 is considered to be the preferred embodiment for most applications.

Not shown in FIG. 4, a bi-refringent optic in the correct orientation can be inserted between the X focusing lens 320 and the X knife edge 321 to effect placing the focus slightly before and after the X knife edge 321 at orthogonal polarizations. Similarly, a bi-refringent optic in the correct orientation can be inserted between the Y focusing lens 330 and the Y knife edge 341 to effect placing the focus slightly before and after the Y knife edge 341 at orthogonal polarizations. This has the effect of reducing the knife edge wavefront sensor gain, generally leading to reduced sensor sensitivity (i.e. requiring more light to operate) but possibly having the advantage in some applications of improved performance.

An estimate of the X gradient, $s_X(n,m)$, and the Y gradient, $s_Y(n,m)$, is given by Equation 2 and Equation 3 as in the description of FIG. 3. Processing the X gradient, $s_X(n,m)$, and the Y gradient, $s_Y(n,m)$ data to recover a gain calibration is straightforward. There are two nominal means to process the data based on the assumption of a sinusoidal tip/tilt modulation. Note that a sinusoidal tip/tilt modulation is not required, however, the use of a sinusoidal tip/tilt modulation simplifies the calibration process and ensures that no data synchronization is required (i.e. one does not need to know the relative synchronization of the observed data time sequence and the tip/tilt modulation time sequence, but instead one only needs to have a calibrated estimate of the amplitude). Similar repeating sequences can be used as long as the number of frames utilized in the calculations below, P, corresponds to the length of a sequence. We compute the Fourier component of the measured data using the following process, $$V_X(n,m) = |\Sigma_{p=k-P}^{k} s_X(n,m,p) \exp(i 2\pi f_x p T_s)|/PA_x, \quad \text{(Eq 23)}$$

$$V_Y(n,m) = |\Sigma_{p=k-P}^{k} s_Y(n,m,p) \exp(i 2\pi f_y p T_s)|/PA_y, \quad \text{(Eq 24)}$$

where $T_S$ is the sample period. The gain maps to be used in real time are then given by, $$K_X(n,m) = 1/V_X(n,m), \quad \text{(Eq 25)}$$

$$K_Y(n,m) = 1/V_Y(n,m). \quad \text{(Eq 26)}$$

Alternately, one can compute the average value of the observed gradient (averaged over the illuminated subapertures) for each value in the time sequence, $$s_X(k) = \langle s_X(n,m,k)/K_{X0}(n,m) \rangle_{n,m}, \quad \text{(Eq 27)}$$

$$s_Y(k) = \langle s_Y(n,m,k)/K_{Y0}(n,m) \rangle_{n,m}, \quad \text{(Eq 28)}$$

We then compute the Fourier component of the measured data using the following process, $$V_X = |\Sigma_{p=k-P}^{k} s_x(p) \exp(i 2\pi f_x p T_s)|/PA_x, \quad \text{(Eq 29)}$$

$$V_Y = |\Sigma_{p=k-P}^{k} s_y(p) \exp(i 2\pi f_y p T_s)|/PA_y, \quad \text{(Eq 30)}$$

and the gain maps $K_X(n,m)$ and $K_Y(n,m)$ are then given by the following, $$K_X(n,m) = K_{X0}(n,m)/V_X, \quad \text{(Eq 31)}$$

$$K_Y(n,m) = K_{Y0}(n,m)/V_Y, \quad \text{(Eq 31)}$$

As with the description of the data processing for FIG. 3, one can perform the computations in Equations 23, 24, 29, and 30 using recursive methods well known to those skilled in the art to simplify the calculation and reduce memory requirements.

Figure 5:
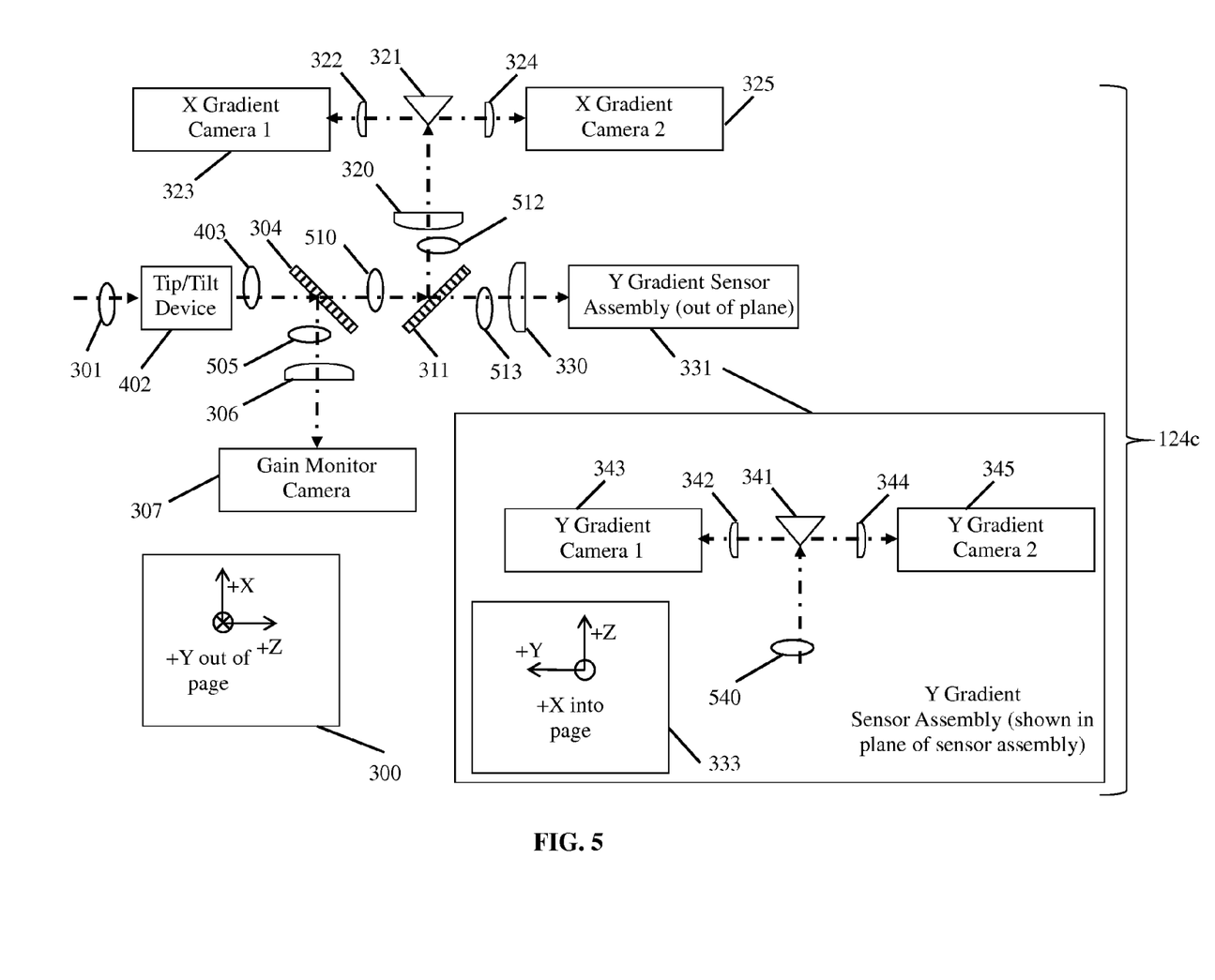
FIG. 5 is a schematic of the third embodiment of the gain-calibrated knife edge wavefront sensor in the present invention. The present invention is comprised of an adaptive optical system utilizing a gain-calibrated knife edge wavefront sensor. Taken in combination, FIG. 5 combined with FIG. 1 or FIG. 2 form the third embodiment of the present invention.

FIG. 5 is a schematic of the third embodiment of the gain-calibrated knife edge wavefront sensor in the present invention. The present invention is comprised of an adaptive optical system utilizing a gain-calibrated knife edge wavefront sensor. Taken in combination, FIG. 5 combined with FIG. 1 or FIG. 2 form the third embodiment of the present invention. FIG. 5 is shown by way of example and not of limitation. There are alternate means of displaying the laser path(s) and/or carrying out the data processing as those skilled in the art would recognize.

Shown in FIG. 5, a beacon beam sample 301 enters the gain-calibrated knife edge wavefront sensor. The beacon beam sample 301 encounters a tip/tilt device 402 that provides a known (i.e. calibrated) time sequence very small signal sinusoidal tip/tilt error with frequency $f_x$ and $f_Y$ and some small amplitude $A_x$ and $A_y$ that does not need to be known for this embodiment (nominally small enough such that the beam still remains crossing the knife edge when the beam is aberration free) to produce the modulated beacon beam sample 403. The tip/tilt device 402 can be implemented using one of numerous means well known to those skilled in the art and should be near a pupil plane to avoid translation of the beams on the first X gradient detector means 323 and the second X gradient detector means 325 and on the first Y gradient detector means 343 and the second Y gradient detector means 345. Potential means to implement the tip/tilt device include, but are not limited to, a Risley Prism on a rotating stage or a fine steering mirror. The use of the known (i.e. calibrated) tip/tilt input signal for gain calibration will be explained shortly.

The modulated beacon beam sample 403 encounters a first beam splitter means 304 that produces a minority modulated beacon beam sample 505 and a majority modulated beacon beam sample 510. The minority modulated beacon beam sample 505 is directed to a focusing lens 306 that produces a beam focus at the gain monitor detector means 307. The gain monitor detector means produces a focused image of the beacon beam sample 301 that can be processed to produce an estimate of the Strehl ratio, denoted S, of the beacon beam sample 301 and an estimate of the beam centroid, $x_c$ and $y_c$, of the beacon beam sample 301 by multiple means well known to those skilled in the art. The most straightforward means to produce an estimate of the Strehl ratio, S, was provided above in the description of FIG. 2.

The data from the gain monitor detector means 307 can also be used to produce an estimate of the beam centroid, $x_c$ and $y_c$, on the detector means using the thresholded centroid method. The thresholded centroid method is well known to those skilled in the art. Other methods well known to those skilled in the art to estimate the beam centroid can be utilized as well. The Strehl ratio estimate, S, as well as the beam centroid, $x_c$ and $y_c$, can all be indexed in time by the frame index k, i.e. S(k) and $x_c(k)$ and $y_c(k)$.

The gain monitor detector means 307 can also be a position sensitive device instead of an array detector. In this case the gain monitor detector means 307 would only produce an estimate of the beam centroid, $x_c$ and $y_c$, of the focused image of the beacon beam sample 301. This option limits the methods that can be utilized to compute the beam centroid values, $x_c$ and $y_c$.

The majority modulated beacon beam sample 510 encounters a second beam splitter means 311 which produces a majority modulated X gradient sample 512 and a majority modulated Y gradient sample 513. The majority modulated X gradient sample 512 is focused by the X focusing lens 320 onto the X knife edge 321. The X knife edge 321 produces a sample of the majority modulated X gradient sample 512 that is directed to the first X collimating lens 322 and first X gradient detector means 323 and a sample of the majority modulated X gradient sample 512 that is directed to the second X collimating lens 324 and second X gradient detector means 325. The combination of the following components forms the "X Gradient Sensor": X knife edge 321, first X collimating lens 322, first X gradient detector means 323, second X collimating lens 324, and second X gradient detector means 325. The first X gradient detector means 323 and the second X gradient detector means 325 are both optically conjugate to the system pupil, which nominally corresponds to the pupil-conjugate plane of the phase correction device means 104.

The majority modulated Y gradient sample 513 encounters the Y focusing lens 330 which focuses the beam into the "Y Gradient Sensor" 531 which is understood to be identical to the "X Gradient Sensor" oriented in the orthogonal plane as shown in FIG. 5 by consideration of the primary coordinate system 300 and the secondary coordinate system 333. It is understood by those skilled in the art that a dove prism or any other set of optics to rotate the majority modulated Y gradient sample 513 can be used to avoid the requirement that the "Y Gradient Sensor" 331 be oriented in the orthogonal plane as shown in FIG. 5. Within the "Y Gradient Sensor" 331 the focusing majority modulated Y gradient sample 540 encounters the Y knife edge 341. The Y knife edge 341 produces a sample of the focusing majority modulated Y gradient sample 540 that is directed to the first Y collimating lens 342 and first Y gradient detector means 343 and a sample of the focusing majority modulated Y gradient sample 540 that is directed to the second Y collimating lens 344 and second Y gradient detector means 345. The first Y gradient detector means 343 and the second Y gradient detector means 345 are both optically conjugate to the system pupil, which nominally corresponds to the pupil-conjugate plane of the phase correction device means 104.

As with FIG. 3, there are numerous variations of the optical schematic provided in FIG. 5 for implementation of the "X Gradient Sensor" and the "Y Gradient Sensor". The description in FIG. 5 is provided by way of example and not by way of limitation. The same alternate configurations described for FIG. 3 apply to FIG. 5. The description in FIG. 5 is considered to be the preferred embodiment for most applications.

Not shown in FIG. 5, a bi-refringent optic in the correct orientation can be inserted between the X focusing lens 320 and the X knife edge 321 to effect placing the focus slightly before and after the X knife edge 321 at orthogonal polarizations. Similarly, a bi-refringent optic in the correct orientation can be inserted between the Y focusing lens 330 and the Y knife edge 341 to effect placing the focus slightly before and after the Y knife edge 341 at orthogonal polarizations. This has the effect of reducing the knife edge wavefront sensor gain, generally leading to reduced sensor sensitivity (i.e. requiring more light to operate) but possibly having the advantage in some applications of improved performance.

An estimate of the X gradient, $s_X(n,m)$, and the Y gradient, $s_Y(n,m)$, is given by Equation 2 and Equation 3 as in the description of FIG. 3. Processing the X gradient, $s_X(n,m)$, and the Y gradient, $s_Y(n,m)$ data to recover a gain calibration is straightforward. There are two nominal means to process the data based on the assumption of a sinusoidal tip/tilt modulation. Note that a sinusoidal tip/tilt modulation is not required, however, the use of a sinusoidal tip/tilt modulation simplifies the calibration process and ensures that no data synchronization is required (i.e. one does not need to know the relative synchronization of the observed data time sequence and the tip/tilt modulation time sequence, but instead one only needs to have a calibrated estimate of the amplitude). Similar repeating sequences can be used as long as the number of frames utilized in the calculations below, P, corresponds to the length of a sequence. We compute the Fourier component of the measured data using the following process, $$V_X(n,m) = |\Sigma_{p=k-P}^{k} s_X(n,m,p)\exp(i2\pi f_x p T_s)|/|\Sigma_{p=k-P}^{k} x_c(p)\exp(i2\pi f_x p T_s)|, \quad (Eq\ 33)$$

$$V_Y(n,m) = |\Sigma_{p=k-P}^{k} s_Y(n,m,p)\exp(i2\pi f_y p T_s)|/|\Sigma_{p=k-P}^{k} y_c(p)\exp(i2\pi f_y p T_s)|, \quad (Eq\ 34)$$

The gain maps to be used in real time are then given by, $$K_X(n,m) = 1/V_X(n,m), \quad (Eq\ 35)$$

$$K_Y(n,m) = 1/V_Y(n,m). \quad (Eq\ 36)$$

Alternately, one can compute the average value of the observed gradient (averaged over the illuminated subapertures) for each value in the time sequence, $$s_X(k) = \langle s_X(n,m,k)/K_{X0}(n,m) \rangle_{n,m}, \quad (Eq\ 37)$$

$$s_Y(k) = \langle s_Y(n,m,k)/K_{Y0}(n,m) \rangle_{n,m}, \quad (Eq\ 38)$$

We then compute the Fourier component of the measured data using the following process, $$V_X = |\Sigma_{p=k-P}^{k} s_x(p)\exp(i2\pi f_x p T_s)|/|\Sigma_{p=k-P}^{k} x_c(p)\exp(i2\pi f_x p T_s)|, \quad (Eq\ 39)$$

$$V_Y = |\Sigma_{p=k-P}^{k} s_y(p)\exp(i2\pi f_y p T_s)|/|\Sigma_{p=k-P}^{k} y_c(p)\exp(i2\pi f_y p T_s)|, \quad (Eq\ 40)$$

and the gain maps $K_X(n,m)$ and $K_Y(n,m)$ are then given by the following, $$K_X(n,m) = K_{X0}(n,m)/V_X, \quad (Eq\ 41)$$

$$K_Y(n,m) = K_{Y0}(n,m)/V_Y, \quad (Eq\ 42)$$

As with the description of the data processing for FIG. 3 and FIG. 4, one can perform the computations in Equations 33, 34, 39, and 40 using recursive methods well known to those skilled in the art to simplify the calculation and reduce memory requirements.

I claim:

1. An electro-optical system for measurement and compensation of aberrations induced by optical wave propagation through an optical system and through a medium from a target to a telescope, the electro-optical system comprising:
   a) a beacon beam receiver that receives an aberrated beacon beam;
   b) wherein said beacon beam receiver passes the aberrated beacon beam through a phase correction device that functions to compensate the phase of the aberrated beacon beam to produce a compensated beacon beam;
   c) wherein said beacon beam receiver passes the compensated beacon beam through an optical system that functions to direct the compensated beacon beam to a gain-calibrated knife edge wavefront sensor;
   d) wherein said gain-calibrated knife edge wavefront sensor functions to split the compensated beacon beam into an "X" gradient compensated beacon beam sample and a "Y" gradient compensated beacon beam sample, focusing the "X" gradient compensated beacon beam sample onto an "X" knife edge that produces a first and a second "X" gradient compensated beacon beam sub-sample, measuring the first and a second "X" gradient compensated beacon beam sub-sample using a first and a second "X" gradient detector that functions to produce a first and a second "X" gradient detector signal, focusing the "Y" gradient compensated beacon beam sample onto a "Y" knife edge that produces a first and a second "Y" gradient compensated beacon beam sub-sample, measuring the first and a second "Y" gradient compensated beacon beam sub-sample using a first and a second "Y" gradient detector that functions to produce a first and a second "Y" gradient detector signal, and wherein said gain-calibrated knife edge wavefront sensor further functions to produce an "X" knife edge gain calibration signal and a "Y" knife edge gain calibration signal; and e) wherein said beacon beam receiver includes a real time processor functioning to process the first and second "X" gradient detector signals, the first and second "Y" gradient detector signals, the "X" knife edge gain calibration signal and the "Y" knife edge gain calibration signal, to produce an "X" gradient signal and a "Y" gradient signal that is further processed to form a command signal for the phase correction device to null a wavefront phase error of the compensated beacon beam measured by said gain-calibrated knife edge wavefront sensor.

2. The electro-optical system of claim 1 wherein said gain-calibrated knife edge wavefront sensor further comprises a beam splitter to split the "X" gradient compensated beacon beam sample and the "Y" gradient compensated beacon beam sample.

3. The electro-optical system of claim 1 said gain-calibrated knife edge wavefront sensor further comprises the "X" gradient signal and the "Y" gradient signal measurements, wherein the measurements are obtained when the "X" gradient signal and the "Y gradient signal are at approximately orthogonal axes.

4. The electro-optical system of claim 1 wherein the phase correction device further comprises a plurality of phase correction devices.

5. The electro-optical system of claim 1 wherein the phase correction device further comprises a reflective phase correction device.

6. The electro-optical system of claim 1 wherein the "X" knife edge further comprises a reflecting prism.

7. The electro-optical system of claim 1 wherein the "X" knife edge further comprises a transmissive prism.

8. The electro-optical system of claim 1 wherein the "Y" knife edge further comprises a reflecting prism.

9. The electro-optical system of claim 1 wherein the "Y" knife edge further comprises a transmissive prism.

10. The electro-optical system of claim 1 wherein said gain-calibrated knife edge wavefront sensor further comprises a first focusing lens that is used to focus the "X" gradient compensated beacon beam sample onto the "X" knife edge.

11. The electro-optical system of claim 1 wherein said gain-calibrated knife edge wavefront sensor further comprises a second focusing lens that is used to focus the "Y" gradient compensated beacon beam sample onto the "Y" knife edge.

12. The electro-optical system of claim 1 wherein said gain-calibrated knife edge wavefront sensor further comprises a first bi-refringent optic at an appropriate location before the "X" knife edge to effect focal planes before and after the "X" knife edge at orthogonal polarizations and correspondingly reduce the gain-calibrated knife edge wavefront sensor gain.

13. The electro-optical system of claim 1 wherein said gain-calibrated knife edge wavefront sensor further comprises a second bi-refringent optic at an appropriate location before the "Y" knife edge to effect focal planes before and after the "Y" knife edge at orthogonal polarizations and correspondingly reduce the gain-calibrated knife edge wavefront sensor gain.

14. The electro-optical system of claim 1 wherein said gain-calibrated knife edge wavefront sensor further comprises an optical configuration such that the first and second "X" gradient detector are comprised of two separate detectors.

15. The electro-optical system of claim 1 wherein said gain-calibrated knife edge wavefront sensor further comprises an optical configuration such that the first and second "Y" gradient detector are comprised of two separate detectors.

16. The electro-optical system of claim 1 wherein said gain-calibrated knife edge wavefront sensor further comprises an optical configuration such that the first and second "X" gradient detector are comprised of a single detector.

17. The electro-optical system of claim 1 wherein said gain-calibrated knife edge wavefront sensor further comprises an optical configuration such that the first and second "Y" gradient detector are comprised of a single detector.

18. The electro-optical system of claim 1 wherein said gain-calibrated knife edge wavefront sensor further comprises an optical configuration such that the first and second "X" gradient detector and the first and second "Y" gradient detector are comprised of a single detector.

19. The electro-optical system of claim 1 wherein said gain-calibrated knife edge wavefront sensor further comprises a gain calibration that functions to provide data that is used to determine the "X" knife edge gain calibration signal and "Y" knife edge gain calibration signal.

20. The electro-optical system of claim 19 wherein said gain calibration further comprises a focusing lens and gain monitor detector that produces a focused compensated beacon beam image of said compensated beacon beam that is processed by the real time processor to determine the "X" knife edge gain calibration signal and "Y" knife edge gain calibration signal by of estimation of the Strehl ratio of the focused compensated beacon beam image.

21. The electro-optical system of claim 19 wherein said gain calibration further comprises a focusing lens and a gain monitor detector that produces a focused compensated beacon beam image of said compensated beacon beam that is processed by the real time processor to determine the "X" knife edge gain calibration signal and "Y" knife edge gain calibration signal by measurement of a correlation between the observed beam motion on said gain monitor detector and said "X" gradient signal and said "Y" gradient signal.

22. The electro-optical system of claim 19 wherein said gain calibration further comprises a focusing lens and a position sensitive detector that produces a measurement of the beam motion of the focused compensated beacon beam image of said compensated beacon beam that is processed by the real time processor to determine the "X" knife edge gain calibration signal and "Y" knife edge gain calibration signal by measurement of a correlation between the observed beam motion on said position sensitive detector and said "X" gradient signal and said "Y" gradient signal.

23. The electro-optical system of claim 19 wherein said gain calibration further comprises a tip/tilt device that produces a known repeating small amplitude temporal tip/tilt disturbance sequence that is utilized by the real time processor to determine the "X" knife edge gain calibration signal and "Y" knife edge gain calibration signal by measurement of a correlation between the commanded tip/tilt disturbance applied by said tip/tilt device and said "X" gradient signal and said "Y" gradient signal.

24. The electro-optical system of claim 19 wherein said gain calibration further comprises a steering mirror that produces a known repeating small amplitude temporal tip/tilt disturbance sequence that is utilized by the real time processor to determine the "X" knife edge gain calibration signal and "Y" knife edge gain calibration signal by measurement of a correlation between the commanded tip/tilt disturbance applied by said tip/tilt device and said "X" gradient signal and said "Y" gradient signal.

25. The electro-optical system of claim 19 wherein said gain calibration further comprises a rotating Risley Prism with an appropriate small wedge angle that produces a known repeating small amplitude temporal tip/tilt disturbance sequence that is utilized by the real time processor to determine the "X" knife edge gain calibration signal and "Y" knife edge gain calibration signal by measurement of a correlation between the commanded tip/tilt disturbance applied by said tip/tilt device and said "X" gradient signal and said "Y" gradient signal.

26. The electro-optical system of claim 19 wherein said gain calibration further comprises a combined tip/tilt device that produces a known repeating small amplitude temporal tip/tilt disturbance sequence and a focusing lens and a gain monitor detector that produces a focused compensated beacon beam image of said compensated beacon beam that is processed by the real time processor to determine the "X" knife edge gain calibration signal and "Y" knife edge gain calibration signal by measurement of a correlation between the observed beam motion on said gain monitor detector and said "X" gradient signal and said "Y" gradient signal.

27. The electro-optical system of claim 1 wherein said optical system further comprises an aperture sharing element that is used to direct an imaging sample of the target to an imaging detector.

28. The electro-optical system of claim 1 wherein said optical system further comprises an aperture sharing element that is used to inject a projected laser beam along the beam path to the target.

29. The electro-optical system of claim 1 wherein said aberrated beacon beam originates at the target by means of active laser illumination of the target.

30. The electro-optical system of claim 1 wherein said aberrated beacon beam originates at the target by means of reflected sunlight or reflected ambient light from the target.

31. The electro-optical system of claim 1 wherein said aberrated beacon beam originates at the target by means of projection of a laser beam from the target.

32. The electro-optical system of claim 1 wherein said aberrated beacon beam originates at the target by means of thermal emission from the target.

33. An electro-optical method for measurement and compensation of aberrations induced by optical wave propagation through an optical system and through a medium from a target to a telescope, the electro-optical method comprising the steps of:
   a) receiving an aberrated beacon beam;
   b) using a phase correction device functioning to compensate the phase of the aberrated beacon beam to produce a compensated beacon beam;
   c) passing the compensated beacon beam through an optical system that functions to direct the compensated beacon beam to a gain-calibrated knife edge wavefront sensor;
   d) wherein said gain-calibrated knife edge wavefront sensor functions to split the compensated beacon beam into an "X" gradient compensated beacon beam sample and a "Y" gradient compensated beacon beam sample, focusing the "X" gradient compensated beacon beam sample onto an "X" knife edge functions to produces a first and second "X" knife edge compensated beacon beam sub-sample, measuring the first and second "X" gradient compensated beacon beam sub-sample using a first and a second "X" gradient detector to produce a first and a second "X" gradient detector signal, focusing the "Y" gradient compensated beacon beam sample onto a "Y" knife edge functions to produces a first and a second "Y" gradient compensated beacon beam sub-sample, measuring the first and a second "Y" gradient compensated beacon beam sub-sample using a first and a second "Y" gradient detector to produce a first and a second "Y" gradient detector signal, and wherein said gain-calibrated knife edge wavefront sensor further functions to produce an "X" knife edge gain calibration signal and a "Y" knife edge gain calibration signal; and
   e) processing the first and second "X" gradient detector signals, the first and second "Y" gradient detector signals, the "X" knife edge gain calibration signal and the "Y" knife edge gain calibration signal, to form a command signal for the phase correction device to null a wavefront phase error of the compensated beacon beam measured by said gain-calibrated knife edge wavefront sensor.

34. The electro-optical method of claim 33 further comprising an optimal configuration of said gain-calibrated knife edge wavefront sensor with the "X" gradient signal and the "Y" gradient signal measurements obtained when the "X" gradient signal and the "Y gradient signal are at approximately orthogonal axes.

35. The electro-optical method of claim 33 further comprising calculation of an "X" gradient signal and a "Y" gradient signal that is further processed form a command signal for the phase correction device to null a wavefront phase error of the compensated beacon beam measured by said gain-calibrated knife edge wavefront sensor.

36. The electro-optical method of claim 33 further comprising use of a gain calibration that functions to provide data that is used to determine the "X" knife edge gain calibration signal and "Y" knife edge gain calibration signal.

37. The electro-optical method of claim 33 further comprising an aperture sharing element that is used to direct an imaging sample of the target to an imaging detector.

38. The electro-optical system of claim 33 further comprising an aperture sharing element that is used to inject a projected laser beam along the beam path to the target.

39. An electro-optical method for measurement and compensation of aberrations induced by optical wave propagation through an optical system and through a medium from a target to a telescope, the electro-optical method comprising the steps of:
   a) receiving an aberrated beacon beam;
   b) using a phase correction device functioning to compensate the phase of the aberrated beacon beam to produce a compensated beacon beam;
   c) passing the compensated beacon beam through an optical system that functions to direct the compensated beacon beam to a plane of a gain-calibrated knife edge wavefront sensor;
   d) wherein said gain-calibrated knife edge wavefront sensor functions to measure a first phase gradient of the compensated beacon beam and to measure a first gain calibration signal of said first phase gradient of the compensated beacon beam;
   e) processing the first phase gradient of the compensated beacon beam and the first gain calibration signal of said first phase gradient of the compensated beacon beam to form a command signal for the phase correction device to null a wavefront phase error of the compensated beacon beam measured by said gain-calibrated knife edge wavefront sensor.

40. The electro-optical method of claim 39 further comprising the steps of measuring a second phase gradient of the compensated beacon beam and measuring a second gain calibration signal of said second phase gradient of the compensated beacon beam.

41. The electro-optical method of claim 40 further comprising the steps of processing the first phase gradient of the compensated beacon beam, the second phase gradient of the compensated beacon beam, the first gain calibration signal of said first phase gradient of the compensated beacon beam, and the second gain calibration signal of said second phase gradient of the compensated beacon beam to form the command signal for the phase correction device to null the wavefront phase error of the compensated beacon beam measured by said gain-calibrated knife edge wavefront sensor.

42. The electro-optical method of claim 40 further comprising an optical configuration of said gain-calibrated knife edge wavefront sensor with the first phase gradient of the compensated beacon beam and the second phase gradient of the compensated beacon beam measurements obtained when the first phase gradient compensated beam and the second phase gradient compensated beam are at approximately orthogonal axes.

43. The electro-optical method of claim 39 further comprising an aperture sharing element that is used to direct an imaging sample of the target to an imaging detector.

44. The electro-optical system of claim 39 further comprising an aperture sharing element that is used to inject a projected laser beam along the beam path to the target.

* * * * *